US 6,801,336 B1

(12) United States Patent
Cook et al.

(10) Patent No.: US 6,801,336 B1
(45) Date of Patent: Oct. 5, 2004

(54) SYSTEM AND METHOD FOR PRODUCING HALFTONED COLOR SEPARATIONS FOR AN OUTPUT IMAGING DEVICE

(75) Inventors: Robert Cook, North Vancouver (CA); Dave Hylands, Burnaby (CA); Daniel John Blondal, Vancouver (CA)

(73) Assignee: Creo Inc., Burnaby (CA)

( * ) Notice: Subject to any disclaimer, the term of this patent is extended or adjusted under 35 U.S.C. 154(b) by 0 days.

(21) Appl. No.: 09/385,335

(22) Filed: Aug. 30, 1999

(51) Int. Cl.[7] .................................................. G06K 1/00
(52) U.S. Cl. ........................ 358/1.9; 382/167; 358/3.07; 358/3.09; 358/3.2; 358/461; 358/512; 358/518
(58) Field of Search ........................ 358/1.9, 534, 515, 358/3.26, 1.13, 296, 3.06, 500, 400, 518–523, 3.07, 536, 3.09, 3.2, 401, 461, 512; 382/270, 260, 274, 167, 237, 162

(56) References Cited

U.S. PATENT DOCUMENTS

| | | | | |
|---|---|---|---|---|
| 3,647,295 | A | * 3/1972 | Dobouney | 355/38 |
| 4,717,954 | A | * 1/1988 | Fujita et al. | 358/523 |
| 4,924,301 | A | 5/1990 | Surbrook | |
| 4,955,065 | A | 9/1990 | Ulichney | |
| 5,278,678 | A | 1/1994 | Harrington | |
| 5,309,246 | A | 5/1994 | Barry et al. | |
| 5,333,069 | A | 7/1994 | Spence | |
| 5,473,439 | A | 12/1995 | Pappas | |
| 5,483,625 | A | 1/1996 | Robertson et al. | |

(List continued on next page.)

FOREIGN PATENT DOCUMENTS

| | | | | |
|---|---|---|---|---|
| EP | 0533593 A2 | * 9/1992 | ............ | H04N/1/46 |
| EP | 0 533 593 A2 | 3/1993 | | |
| EP | 0 556 133 A3 | 8/1993 | | |
| EP | 0 556 133 A2 | 8/1993 | | |
| EP | 0 790 548 A1 | 8/1997 | | |
| EP | 0 800 309 A2 | 10/1997 | | |
| EP | 1 033 256 A2 | 9/2000 | | |
| EP | 1 033 256 A3 | 9/2000 | | |
| JP | 0820187 A2 | * 7/1997 | ............ | H04N/1/52 |

OTHER PUBLICATIONS

Enge, J., "Patent Concept —Multiple Halftoning Technique for Simulating Conventional Screen Angles While Maintaining Color Matchability Using Stochastic Screening," *Internal Correspondence Memo*, IRIS (a Scitex Company), dated Jan. 12, 1999, 4 pages.

U.S. patent application Ser. No. 09/667,900, Pinard et al., filed Sep. 22, 2000.

*Color Proofing System (CPS) User Guide*, Creo, Aug. 15, 1997.

*Primary Examiner*—Kimberly Williams
*Assistant Examiner*—Melanie Vida
(74) *Attorney, Agent, or Firm*—Christensen O'Connor Johnson Kindness PLLC (57) ABSTRACT

A raster image processing system (20) for producing the appropriate number and set of halftoned color separations for a select output device (24) is disclosed. The raster image processing system (20) includes a processing unit (30), an interpreter (32) and a color combiner (34). The interpreter (32) and color combiner (34) are application processes that are controlled by software running on the processing unit (30). The processing unit (30) identifies the number and set of colorants used to describe input image data and the number and set of halftoned color separations that a select output imaging device (24) is capable of rendering. The interpreter (32) converts the input data describing an image that is composed of "N" colorants into "N" halftoned color separations. The color combiner (34) thereafter converts the N halftoned color separations into "M" halftoned color separations that are ideally suited for the particular output device (24) chosen by a user of the system. The color combiner (34) performs this conversion by utilizing digital filtering and combining processes.

4 Claims, 7 Drawing Sheets

U.S. PATENT DOCUMENTS

| | | |
|---|---|---|
| 5,550,647 A | 8/1996 | Koike |
| 5,553,171 A | 9/1996 | Lin et al. |
| 5,572,632 A * | 11/1996 | Laumeyer et al. ......... 358/1.17 |
| 5,633,990 A | 5/1997 | Housel |
| 5,640,254 A | 6/1997 | Sexton |
| 5,671,340 A * | 9/1997 | Chapman et al. ............ 358/1.1 |
| 5,687,300 A | 11/1997 | Cooper |
| 5,696,612 A | 12/1997 | Thornton |
| 5,729,664 A | 3/1998 | Ishikawa |
| 5,734,484 A | 3/1998 | Yamamoto et al. |
| 5,751,433 A | 5/1998 | Narendranath et al. |
| 5,751,434 A | 5/1998 | Narendranath et al. |
| 5,760,928 A | 6/1998 | Motoyama et al. |
| 5,786,907 A | 7/1998 | Lotspiech |
| 5,805,734 A | 9/1998 | Ebner |
| 5,806,430 A | 9/1998 | Rodi |
| 5,825,986 A | 10/1998 | Ferguson |
| 5,838,333 A | 11/1998 | Matsuo |
| 5,844,688 A | 12/1998 | Shimizu et al. |
| 5,845,056 A * | 12/1998 | Kohler et al. ................ 358/1.9 |
| 5,855,433 A | 1/1999 | Velho et al. |
| 5,949,965 A | 9/1999 | Gondek |
| 5,953,988 A | 9/1999 | Vinck |
| 2003/0058291 A1 | 3/2003 | Pinard et al. |

* cited by examiner

SYSTEM AND METHOD FOR PRODUCING HALFTONED COLOR SEPARATIONS FOR AN OUTPUT IMAGING DEVICE

FIELD OF THE INVENTION

This invention generally relates to a system and method for producing halftoned color separations from input data describing an image and, more particularly, to a system and method for producing halftoned color separations that are ideally suited for a specific output imaging device.

BACKGROUND OF THE INVENTION

Traditionally, in the prepress field, input data describing an image, such as a PostScript input file, is transformed into at least one halftoned color separation which is ultimately either saved to a file or immediately sent to an output device for imaging. The transformation of the input data to at least one halftoned color separation is performed by a Raster Image Processor (RIP).

In particular, the RIP converts input data to bitmap data, which is required by output devices to render the image. In this regard, the RIP creates a bitmap image, i.e. a series of 1s and 0s, typically for each of the colorants used to compose the image, and hence, in this instance, the resulting bitmap is also called a "halftoned color separation" which is a 1 bit per pixel bitmap. When the input data is completely rasterized, the RIP transfers the bitmap data via a device driver to an output device which uses the information in the bitmap data to render the image. Alternatively, the RIP can store the bitmap data to a file for later importation into an output device.

Typically, if the input data identifies "N" colorants for composing the image, most RIPs receiving such input data produce "N" halftoned color separations, one for each colorant. However, a selected output device may only be capable of imaging "M" halftoned color separations such that there is not a direct mapping from the N halftoned color separations to the M halftoned color separations. In order for a direct mapping to exist, all of the N colorants must be included in the set of colorants corresponding to the M halftoned color separations.

As an example, if N is greater than M and the N halftoned color separations include the specific set of M halftoned color separations, the output device images only the M halftoned color separations. Thus, the resulting image lacks any colors provided by the other of the N halftoned color separations which were not included in the set of M halftoned color separations and hence were not imaged by the output device. In particular, assume that the RIP produces five halftoned color separations representing process colors cyan, yellow, magenta and black (CYMK) and a spot color "cherry apple red." Also, assume that the output device is capable of imaging four halftoned color separations representing the process colors CYMK. In this case, the selected output device will only image the four halftoned color separations representing the process colors, i.e. the colors in common between the sets of halftoned color separations. Thus, any objects in the image described in the spot color will not be provided in the output from the imaging device.

As another example, if N is equivalent to M and the specific halftoned color separations produced by the RIP and required by the output device are identical, i.e. there is a direct mapping from the N halftoned color separations to the M halftoned color separations, the result from the output device most accurately describes the original image since all of the halftoned color separations provided by the RIP are imaged by the output device. However, in this example, if the specific halftoned color separations are not identical, the output device will only image those colors represented by halftoned color separations that the output device has in common with the ones provided by the RIP.

Some RIPs try to resolve the negative results described above by internally converting the halftoned color separations that it produces into the appropriate number and set of halftoned color separations for a select output device. However, presently, when these converted color separations are applied to the output device, the output therefrom does not accurately reflect the original content used to compose the image. Some colorants may be missing or misrepresented with respect to overprints or knockouts.

As a result, there is a need for a system and method that produces the appropriate number and set of halftoned color separations for a select output device such that the resulting image more accurately reflects the original.

SUMMARY OF THE INVENTION

In accordance with the present invention, a raster image processing system automatically produces the appropriate number and set of halftoned color separations for a select output device. The raster image processing system includes a processing unit, an interpreter and a color combiner. The interpreter and color combiner are application processes that are controlled by software running on the processing unit. The processing unit receives input data describing an image having "N" colorants and controls processes implemented by the interpreter and the color combiner. The processing unit identifies the number and set of colorants used to describe input image data and the number and set of halftoned color separations that an output imaging device is capable of rendering. The interpreter converts the input data describing an image having "N" colorants into "N" halftoned color separations. Then, the color combiner converts the N halftoned color separations into "M" halftoned color separations that are ideally suited for a particular output device as chosen by a user of the system. The color combiner performs this conversion by utilizing digital filtering and combining processes.

Before filtering and combining the halftoned color separations produced by the interpreter, the raster image processing system performs a database search to identify a set of filters to apply to each of the N halftoned color separations. In particular, the raster image processing system identifies tint percentages for each of the N halftoned color separations. The tint percentages identify the percentage contribution of each color that the output device is capable of imaging in each of the N halftoned color separations. Then, the raster image processing system dynamically computes the filters based on the tint percentages. The filters are bitmaps that, once created, are applied to the N halftoned color separations by performing a bitwise "AND" combination function therebetween to produced filtered halftoned color separations. Then, select filtered halftoned color separations are combined using a bitwise "OR" combination function such that the appropriate M halftoned color separations are produced. These M halftoned color separations are ideally suited for the selected output device to most accurately render the original image.

As will be readily appreciated from the foregoing description, the invention provides for a raster image processing system that produces M halftoned color separations that are ideally suited for the selected output device to most accurately render the original image. Such a raster image processing system is capable of being used with numerous different output devices, each of which is capable of imaging a different number and/or types of colorants, and still produce the same image because the M halftoned color separations produced by the system are tailored to the specific output device selected by a user.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is a raster image processing (RIP) system and method that produces the appropriate number and set of halftoned color separations for use by a particular output device as selected by a user of the system.

Figure 1:
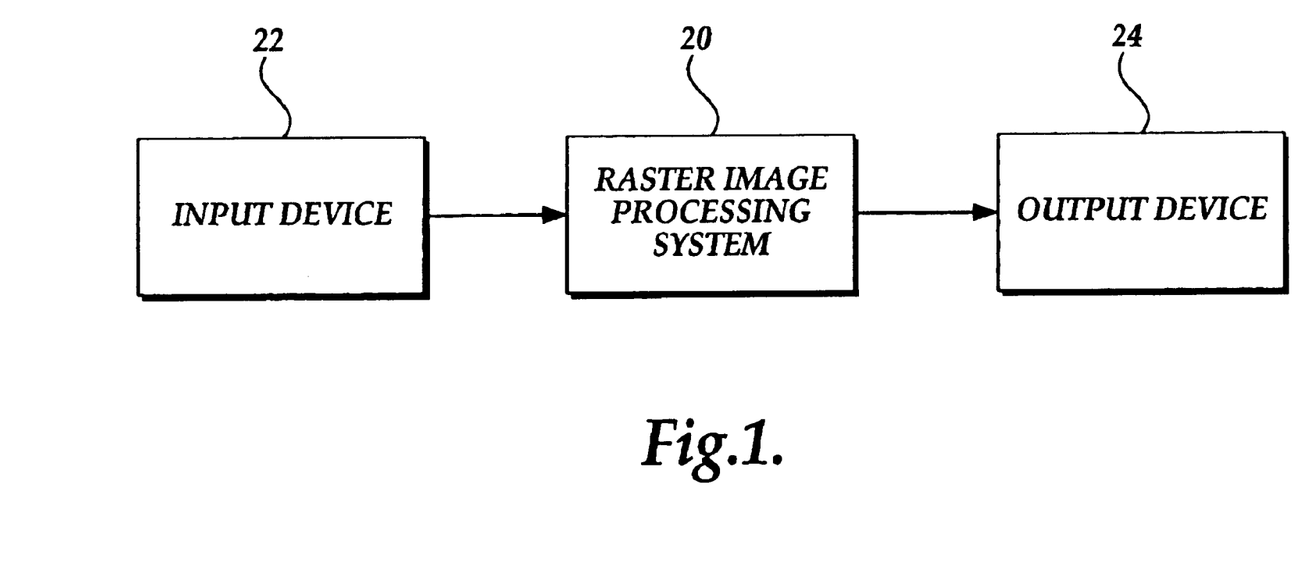
FIG. 1 is a block diagram that illustrates a raster image processing system formed in accordance with the present invention in a prepress workflow environment.

FIG. 1 illustrates a raster image processing (RIP) system 20 of the present invention that interfaces with an input device 22 and an output device 24. As will be described in more detail below, the RIP system 20 receives and processes input data describing an image from the input device 22. The input device can be of any type that is used for creating and/or storing data that describes an image. Examples include a computer workstation, a server, a data storage medium, or the like. The data may be directly transferred to the RIP system upon creation or stored on a storage medium and later downloaded and transferred to the RIP system. An example of such stored data is a PostScript file. After processing the input data, the RIP system 20 outputs at least one halftoned color separation to the output device 24. As also further described below, the at least one halftoned color separation is ideally suited for the particular output device 24 such that the image rendered by the output device 24 adequately represents the original created by the input device 22. The output device can be of any type capable of rending an image. Examples include an image recorder, laser printer, platesetting device or the like.

Figure 2:
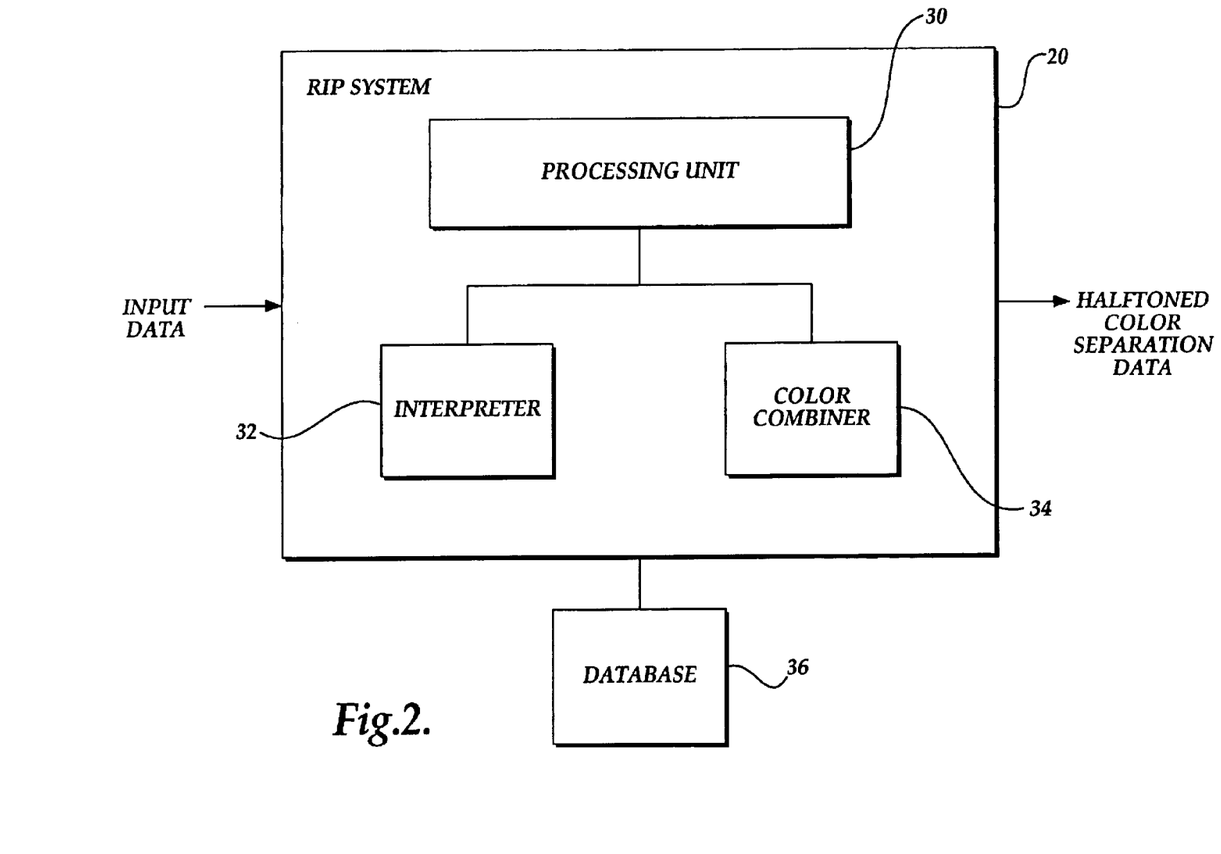
FIG. 2 is block diagram that illustrates the components of the raster image processing system of FIG. 1 in accordance with this invention.

FIG. 2 illustrates the components of the RIP system 20 of the present invention. The RIP system 20 includes a processing unit 30, an interpreter 32, and a color combiner 34. The processing unit 30, among other things, receives the input data from the input device 22 and controls processes implemented by the interpreter 32 and the color combiner 34. The interpreter 32 converts the input data describing an image that is composed of "N" colorants into "N" halftoned color separations as is well known in the art. If certain conditions are met, as will be described below, the color combiner 34 converts the N halftoned color separations into "M" halftoned color separations, where N is typically greater than or equal to M but can have any relationship. Essentially, the color combiner 34 maps the N halftoned color separations into the specific M halftoned color separations that a user selected one of a plurality of output devices is capable of imaging. Accordingly, the M halftoned color separations are eventually fed to the output device 24. The RIP system 20 also includes an internal database (not shown) and/or interfaces an external database 36 for storing information that is necessary to convert the input data into the appropriate M halftoned color separations that the selected output device is capable of imaging.

Although depicted as discrete blocks, it will be appreciated by those skilled in the art and others that the interpreter and color combiner blocks 32 and 34 are merely representative of application processes performed by software which is controlled by the processing unit 30.

Figure 3:
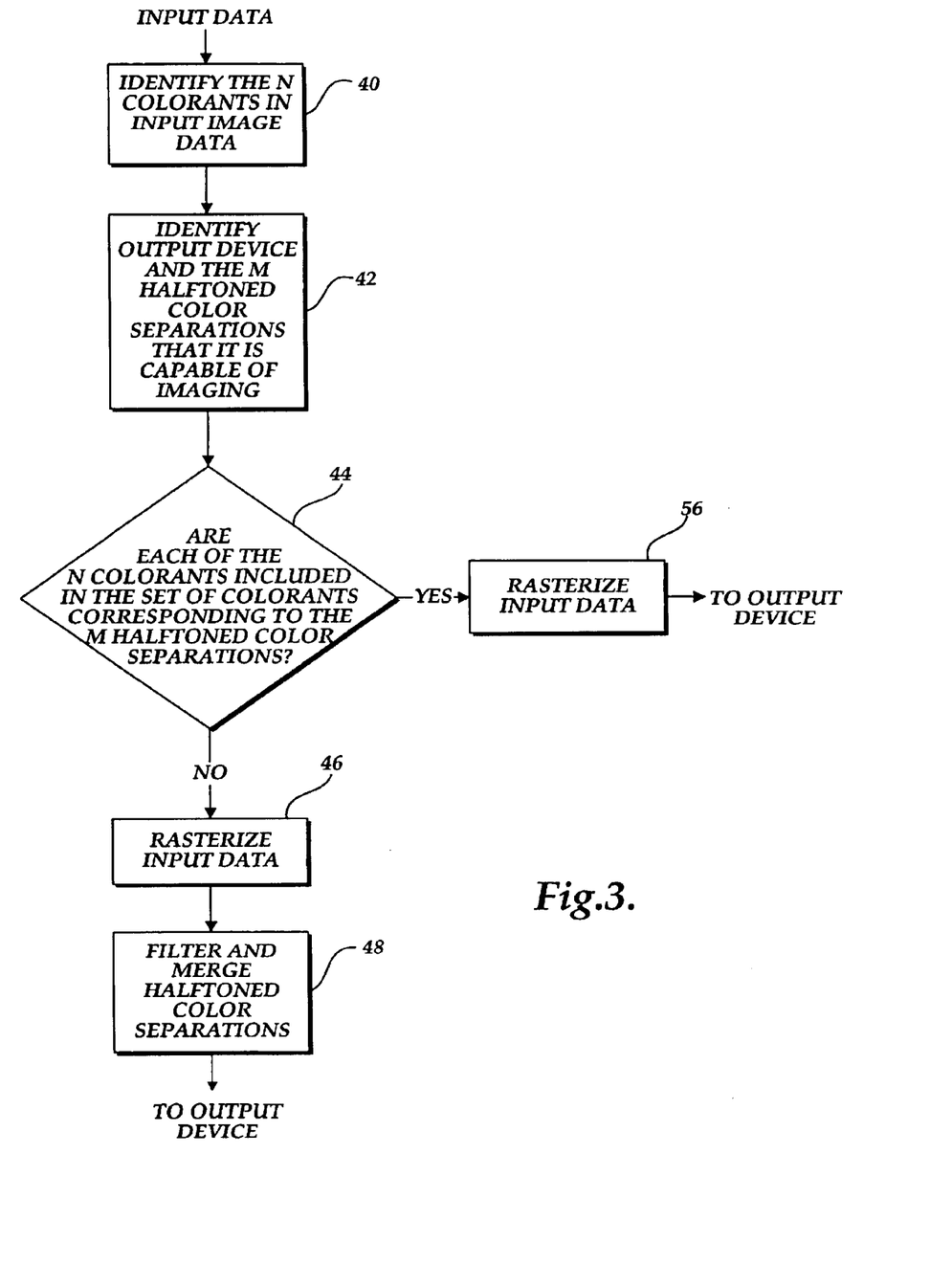
FIG. 3 is a flow diagram illustrating the logic used by the raster image processing system of this invention to produce the appropriate halftoned color separations for a select output device.

FIG. 3 depicts the logic implemented by the RIP system 20 to produce halftoned color separations that are ideally suited for a specific output imaging device. First, at a step 40, the number of colorants, "N", in the image described by the input data is identified by the RIP system 20. Then, the particular output device selected by a user and the number of color separations, "M", that the output device is capable of imaging are identified by the RIP system 20 at a step 42. This information is identified by software running on the processing unit 30. Preferably, the RIP system 20 identifies the number of color separations, "M", that the output device is capable of imaging specifically by referencing the database 36.

Next, a test is made at a step 44 to determine whether there exists a direct mapping between the N color separations produced by the interpreter and the M color separations that the output device is capable of imaging, i.e. whether each of the N colorants identified by the original input data are included in the set of M colorants represented by the M halftoned color separations that the selected output device is capable of imaging. If the answer to the test at step 44 is no, meaning that at least one of the colorants described by the input data is not itself presently imageable by the output device, the input data describing the image having N colorants is rasterized by the interpreter 32 at a step 46. The interpreter 32 produces a separate halftoned color separation for each of the N colorants in the original image. As a result, the interpreter 32 outputs N halftoned color separations. These halftoned color separations are essentially 1 bit per pixel bitmaps, where each pixel either has a value of 1 or 0 indicating that a pixel is either turned on or off. At a step 48, the N halftoned color separations are filtered and the resulting filtered halftoned color separations are merged by the color combiner 34 to produce M color separations that are ideally suited for the selected output device 24, as will be described in further detail below. The M halftoned color separations are ultimately fed to the output device for rendering an image that most accurately reflects the image as originally composed by the input device.

On the other hand, if the answer to the test at step 44 is yes, meaning that the selected output device is capable of imaging all of the colorants described in the input data as originally defined, the input data describing the image composed of the N colorants is rasterized by the interpreter 32 to produce N halftoned color separations which are then available for sending to the output device 24 for imaging. See step 56. In this case, the N halftoned color separations are not applied to the color combiner 34.

Figure 4:
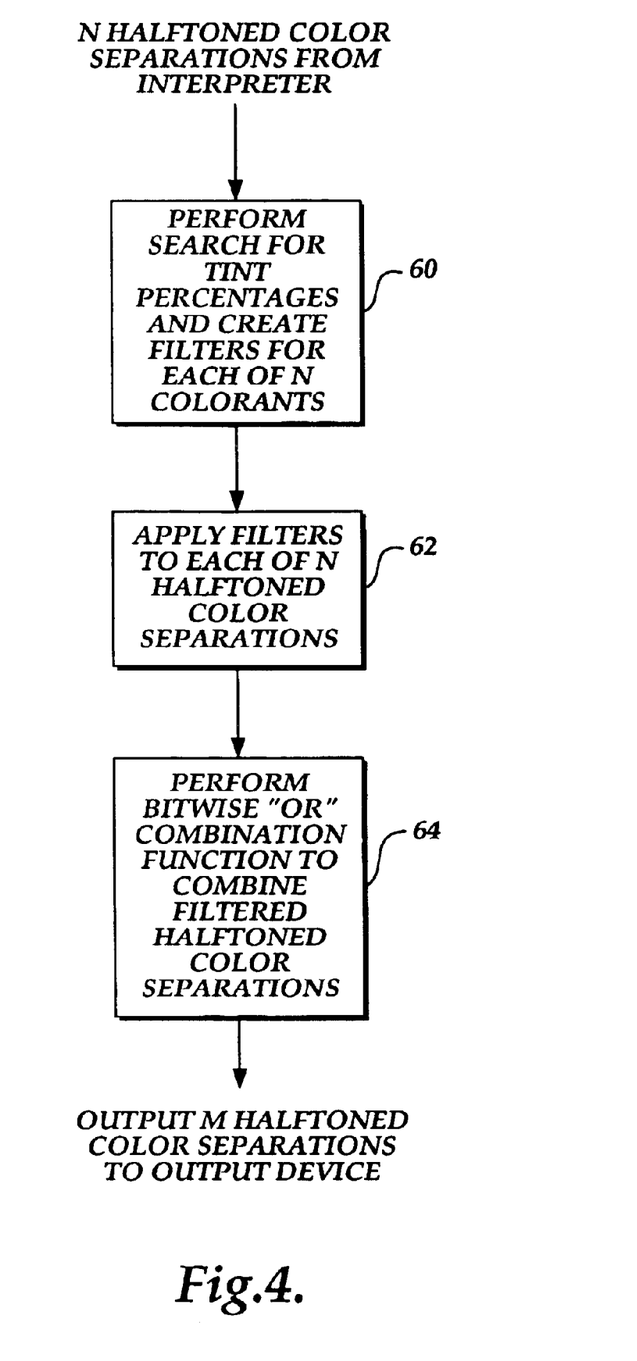
FIG. 4 is a flow diagram illustrating the logic used by a color combiner process of the raster image processing system of this invention.

FIG. 4 is a flow diagram illustrating the steps performed by the color combiner 34 to filter and merge the N halftoned color separations as generally described in step 48 of FIG. 3. Beginning with a step 60, upon receiving the N halftoned color separations from the interpreter 32, a database search is performed by the RIP system 20 to identify a set of filters to apply to each of the N halftoned color separations. In particular, the database search results in the identification of tint percentages corresponding to each of the N halftoned color separations. The tint percentages identify the percentage contribution of each color that the output device 24 is capable of imaging in each of the N halftoned color separations. Then, the filters are computed dynamically based on the tint percentages identified in the database 36.

For example, if the interpreter produces five halftoned color separation and the output device is capable of imaging four halftoned color separations, the database search identifies the percentage of each of the four colorants that are imaged by the output device in each of the five halftoned color separation. With these tint percentages, a set of four filters is applied to each of the five halftoned color separations. It will be appreciated by those skilled in the art and others that the database search for the tint percentages can be performed by the RIP system 20 at any point after steps 40 and 42.

Next, at a step 62, after the filters are dynamically computed by the processing unit 30, each set of filters is applied to its corresponding halftoned color separation produced by the interpreter 32. The filters are essentially 1 bit per pixel bitmaps and are preferably one-dimensional stochastic filters, meaning that the size of each dot is fixed but the placement is pseudo-random. Alternatively, two-dimensional stochastic filters can be used, where both the size of each dot and placement of each dot are pseudo-random. It will be further appreciated by those skilled in the art and others that the filters could be bitmaps of halftoned dots. However, this would lead to a clash between the halftoned input pattern and the halftoned filter and, thus, would result in moire or produce other artifacts which cause undesirable patterns.

Figure 6:
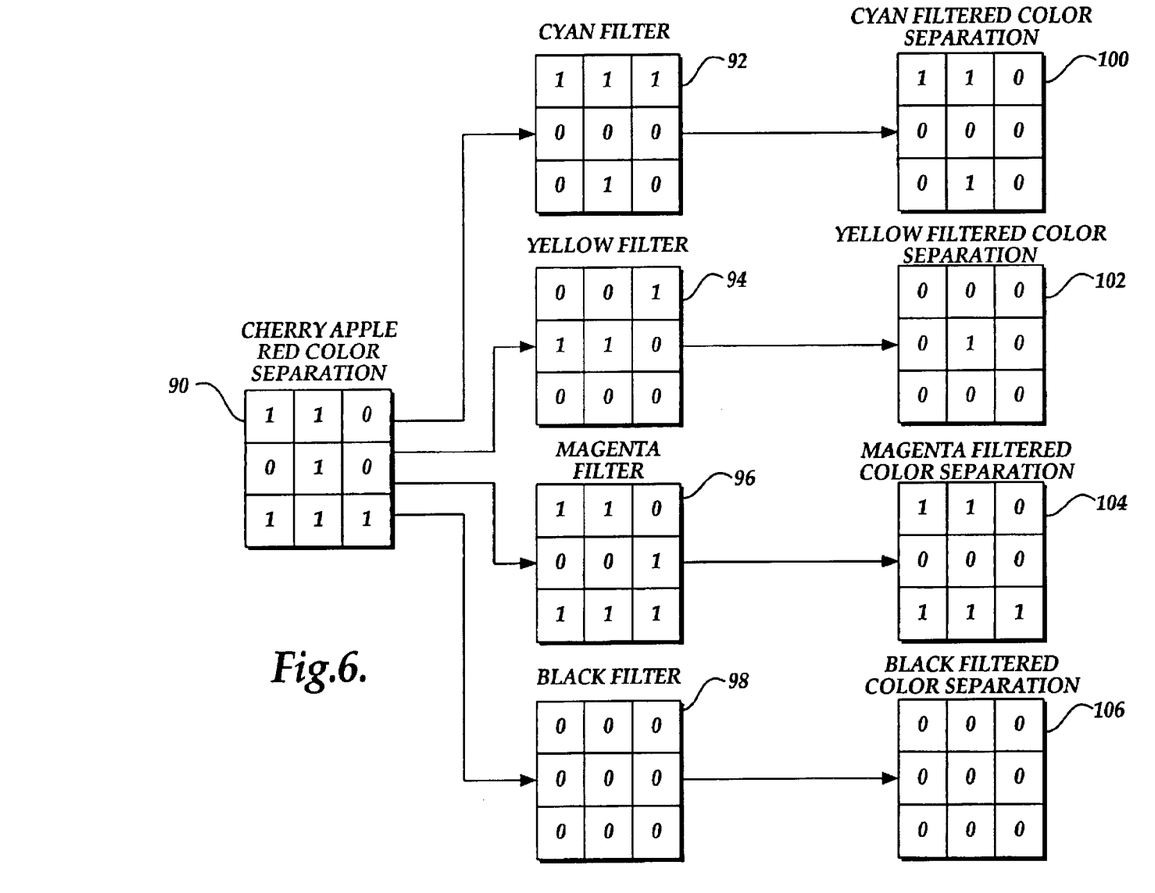
FIG. 6 is a block diagram that illustrates an example of the bitwise "AND" combination function performed when filtering halftoned color separations in accordance with this invention.

The filters are applied to the N halftoned color separations by performing a bitwise "AND" combination function, as is best illustrated in an example depicted in FIG. 6. FIG. 6 illustrates a 3×3 halftoned color separation 90 for a spot color identified as "cherry apple red", a set of four 3×3 filters 92, 94, 96, 98, and a set of four output 3×3 halftoned color separations 100, 102, 104, 106 resulting from the application of the bitwise "AND" combination function to the cherry apple red halftoned color separation and each of the filters. In accordance with this example, the output device is capable of imaging four halftoned color separations representing the process colors cyan, yellow, magenta, and black. Thus, the first step, as described with reference to step 60 of FIG. 4, is to identify the percentages of cyan, yellow, magenta and black that are used to create the cherry apple red spot color. Then, cyan, yellow, magenta and black filters are dynamically created for individually applying to the cherry apple red halftoned color separation. As shown in FIG. 6, when both the pixels in the halftoned cherry apple red color separation and the cyan filter have a "1" in the same position, the resulting cyan filtered color separation has a "1" in the corresponding position. Any other scenario results in a "0" in the corresponding position. This process is repeated for each of the yellow, magenta and black filters as shown in FIG. 6. This process is also repeated for each of the halftoned color separations produced by the interpreter.

Figure 7:
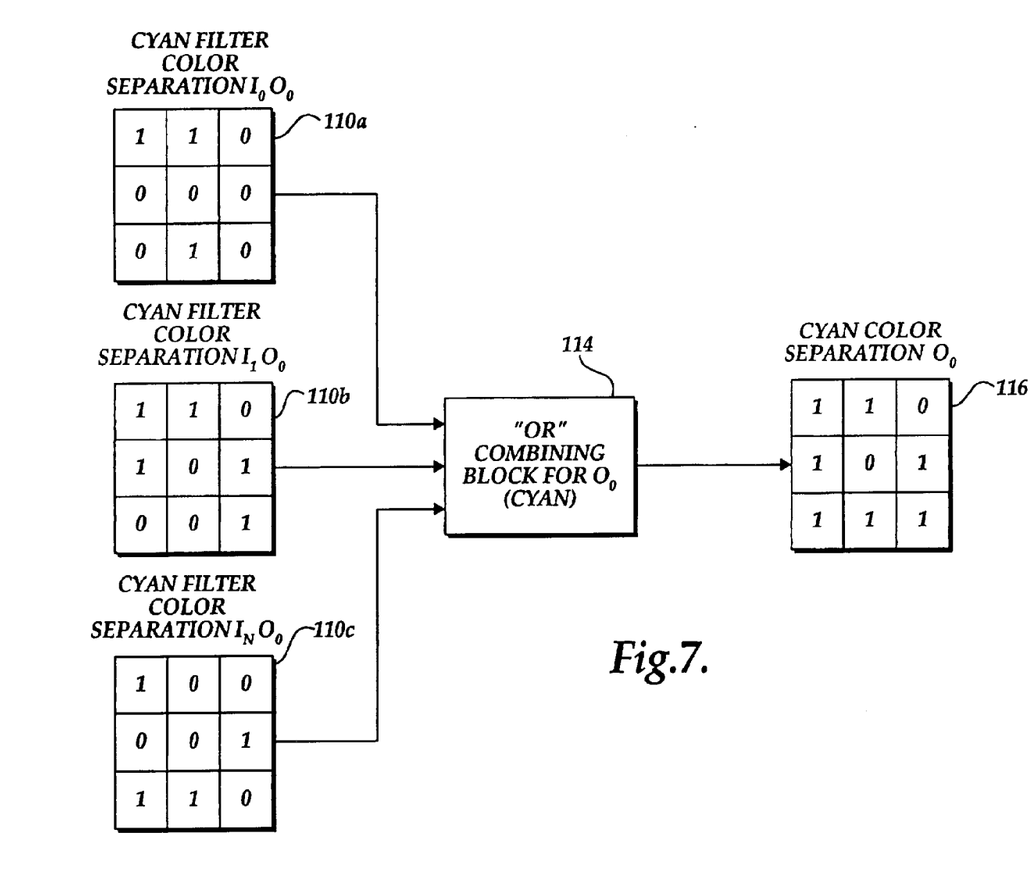
FIG. 7 is a block diagram that illustrates an example of the bitwise "OR" combination function performed on filtered halftoned color separation to produce the desired number and set of halftoned color separations for the select output device.

Returning to FIG. 4, after the filters are applied to each of the N halftoned color separations at step 64, the output from the filters is merged in order to produce M color separations which are ideally suited for the selected output device. In particular, this merging is accomplished by a bitwise "OR" combination function that combines each of the filters associated with one of the M colors corresponding to the M color separations to produce a merged, halftoned color separation for that particular color. For example, if a cyan filter is applied to N halftoned color separations, the result is N cyan filtered halftoned color separations. Then, in accordance with this example, as shown in FIG. 7, N cyan filtered halftoned color separations shown at blocks 110*a*, 110*b*, 110*c* are applied to an "OR" combining block 114. When any one of the N filtered halftoned color separations have a "1" in the same position, the "OR" combining block produces a "1" in a corresponding position in the resulting merged cyan halftoned color separation 116. If a "0" is in the same position for all of the N filtered halftoned color separation, the result is a "0" in the resulting merged cyan halftoned color separation 116. This process is repeated for each -of the colorants associated with the M color separations accepted by the output device. Thus, the result is M halftoned color separations that are suited for the selected output device.

Figure 5:
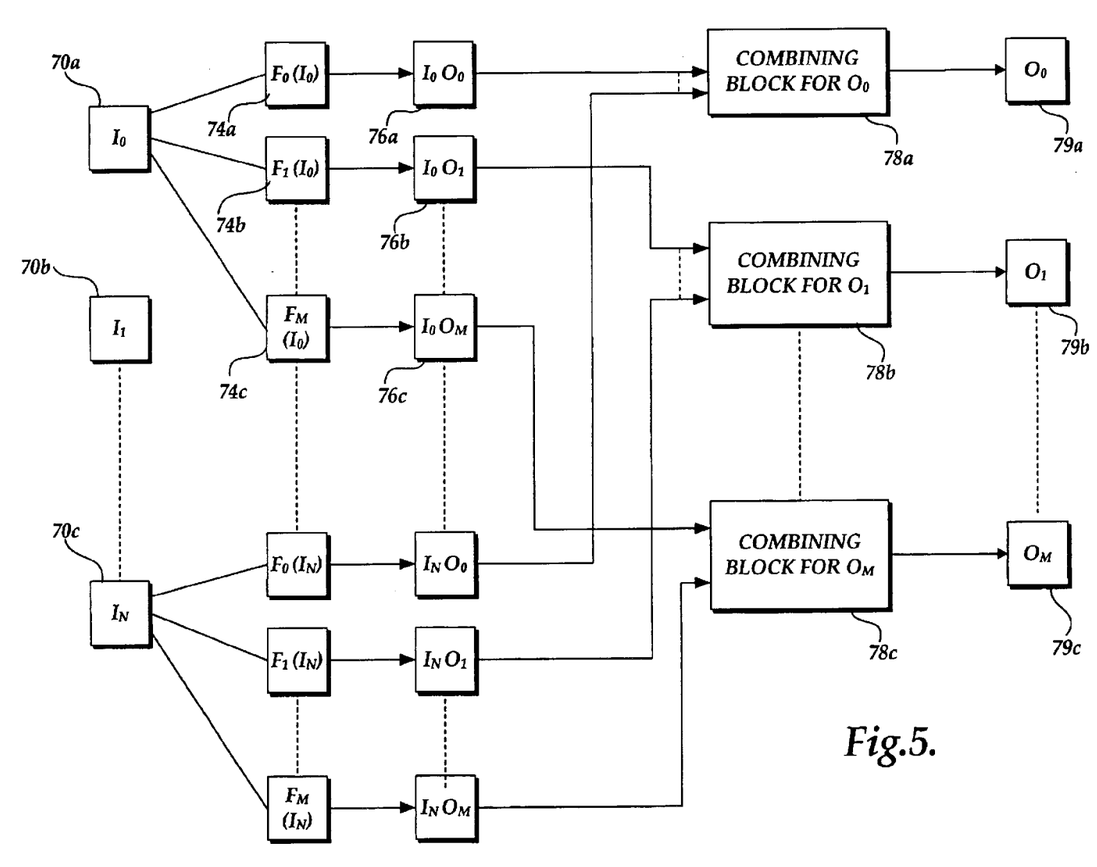
FIG. 5 is a block diagram that illustrates the color combiner component of the raster image processing system of FIG. 2 in further detail.

FIG. 5 is a block diagram illustrating how the filtering and combining of the N halftoned color separations used by the interpreter are accomplished to produce the M color separations that are ideally suited for the selected output device. Each of the blocks 70*a*, 70*b*, 70*c* represent one of N halftoned color separations produced by the interpreter 32. To further illustrate the above described filtering and merging of the N halftoned color separations into M halftoned color separations, the conversion process for one of the N halftoned color separations will be described since this process is simply repeated for each of the remaining N halftoned color separations.

First, taking the halftoned color separation, $I_0$, shown at block 70*a*, a set of filters $F_M(I_0)$ are applied to the halftoned color separation $I_0$. Each of the filters $F_M$ corresponds to one of the colors associated with the M color separations which are accepted by the output device. Thus, as shown in FIG. 6, if the halftoned color separation $I_0$ is a cherry apple red color separation and the selected output device images a maximum of four halftoned color separations representing the colors cyan, yellow, magenta and black, i.e. M=4, four filters that each correspond to one of the colors accepted by the output device are applied to the cherry apple red halftoned color separation as shown by blocks 74*a*, 74*b*, 74*c*. Returning to FIG. 5, the result from filtering is a set of filtered halftoned color separations $I_0O_M$ as shown by blocks 76*a*, 76*b*, 76*c*. This process is repeated for each of the halftoned color separations $I_0, I_1, \ldots I_N$ shown in blocks 70*a*, 70*b*, 70*c*. In this regard, a set of $F_M$ filters is applied to each of these halftoned color separations such that for each of the halftoned color separations a set of M filtered halftoned color separations are produced. Next, all of the filtered halftoned color separations corresponding to one of the M colorants that the output device is capable of imaging are merged together in an "OR" combining block. This merging process is repeated for each set of filters corresponding to one of the M colorants imaged by the output device as best shown at "OR" combining blocks 78a, 78b, 78c in FIG. 5. These "OR" combining blocks function the same as the "OR" combining block 114 in FIG. 7. The results from the "OR" combining blocks 78a, 78b, and 78c are M halftoned color separations, $O_M$, which are now suitable for receipt by the selected output device. See blocks 79a, 79b, and 79c.

With reference to FIGS. 3–7, the steps that are identified as being performed generally by the RIP system or by the interpreter and color combiner in particular are more specifically accomplished by the programming unit 30 which is programmed accordingly.

As will be readily appreciated by those skilled in the art and others, a raster image processing system formed in accordance with the invention has a number of advantages. First, where the interpreter produces more halftoned color separation than the selected output imaging device is capable of rendering, by filtering and merging these halftoned color separations in accordance with this invention to produce the appropriate number and set of halftoned color separations for the output device, the entire output from the output imaging device can be imaged in one step, rather than in parts as would presently have to be done. Besides simplifying the imaging process by eliminating the need to handle the imaging in parts, this invention also dramatically improves the performance of the proofing process by reducing the amount of data the output device must consume before imaging. In addition, by reducing the number of colorants required to represent the image, this invention provides a cost savings.

Furthermore, by applying digital filtering to halftoned color separations and merging the filtered results to produce the appropriate set of halftoned color separations for rendering by the output device, the image produced by the selected output device most accurately reflects the original image with few, if any, negative imaging results. Finally, by automatically determining the appropriate number and set of halftoned color separations needed for a particular selected output device and thereafter filtering and combining halftoned color separations to produce the particular number and set of halftoned color separations, not only is the imaging process simplified, but the raster image processing system can be effectively utilized with many different output devices to produce the same image. This is advantageous as not all output devices can accept the same number of colorants. However, by using this invention, a user can produce the same image with different devices capable of imaging different numbers and/or types of colorants.

While the preferred embodiment of the invention has been illustrated and described, it will be appreciated that various changes can be made therein without departing from the spirit and scope of the invention. For example, while, for ease of illustration, the interpreter and color combiner are depicted as discrete blocks in FIG. 2, it is to be understood that the functions associated with the blocks can be carried out in various ways. In particular, the functions can be implemented in software, hardware, or a combination of hardware and software. Furthermore, although the system clearly applies to a conversion process for converting one set of colorants corresponding to the N halftoned color separations to another set of colorants describing the M halftoned color separations, the conversion also applies to converting a set of colorants corresponding to the N halftoned color separations to a single grayscale halftoned color separation.

Even further, the steps 42 and 46 shown in FIG. 3 can alternatively be performed after the interpreter rasterizes the input data to produce the N halftoned color separations. Thus, in this instance, the raster image processing system identifies the N colorants in the input data; rasterizes the input data to produce N halftoned color separations; and then identifies the selected output device and the number and type of halftoned color separations it can image and determines whether the color combiner process needs to be implemented. If the color combiner process need not be implement, the system simply outputs the rasterized data. Otherwise, the raster image processing system continues with the filtering and merging described at step 48 and in FIGS. 4–7.

What is claimed is:

1. A method for converting a first plurality of halftone color separations into a second plurality of halftone color separations, the first plurality of halftone color separations representing an image, the second plurality of halftone color separations corresponding to available colorants on a target output device, the method comprising the steps of:

determining which of the first plurality of halftone color separations correspond to the available colorants on the target output device;

determining which of the first plurality of halftone color separations correspond to colorants that are unavailable on the target output device to identify at least one unavailable colorant;

converting the at least one halftone color separation in the first plurality of halftone color separations corresponding to the at least one unavailable colorant into a set of color separations representative thereof, the set of color separations corresponding in colorant to the available colorants, wherein the step of converting further comprises:

(i) establishing a plurality of filters in accordance with a pre-determined tint percentage for the available colorants which in combination are representative of the at least one unavailable colorant; and (ii) applying the plurality of filters to the color separation in the first plurality of halftone color separations corresponding to the at least one unavailable colorant, wherein applying the plurality of filters comprises performing a bitwise "AND" between the color separation in the first plurality of halftone color separations corresponding to the at least one unavailable colorant and each of the plurality of filters; and combining the set of halftone color separations representative of the at least one unavailable colorant with the color separations in the first plurality of halftone color separations corresponding to the available colorants to produce the second plurality of halftone color separations.

2. A method for converting a first plurality of halftone color separations into a second plurality of halftone color separations, the first plurality of halftone color separations representing an image, the second plurality of halftone color separations corresponding to available colorants on a target output device, the method comprising the steps of:

determining which of the first plurality of halftone color separations correspond to the available colorants on the target output device;

determining which of the first plurality of halftone color separations correspond to colorants that are unavailable on the target output device to identify at least one unavailable colorant:

converting the at least one halftone color separation in the first plurality of halftone color separations corresponding to the at least one unavailable colorant into a set of color separations representative thereof, the set of color separations corresponding in colorant to the available colorants: and combining the set of halftone color separations representative of the at least one unavailable colorant with the color separations in the first plurality of halftone color separations corresponding to the available colorants to produce the second plurality of halftone color separations, wherein the step of combining comprises performing, on a colorant-by-colorant basis, a bitwise "OR" between the set of halftone color separations representative of the at least one unavailable colorant and the color separations in the first plurality of halftone color separations corresponding to the available colorants.

3. A method for converting a first plurality of halftone color separations into a second plurality of halftone color separations, the first plurality of halftone color separations representing an image, the second plurality of halftone color separations corresponding to available colorants on a target output device, the method comprising the steps of:

determining which of the first plurality of halftone color separations correspond to the available colorants on the target output device;

determining which of the first plurality of halftone color separations correspond to colorants that are unavailable on the target output device to identify at least one unavailable colorant;

converting the at least one halftone color separation in the first plurality of halftone color separations corresponding to the at least one unavailable colorant into a set of color separations representative thereof, the set of color separations corresponding in colorant to the available colorants, wherein the step of converting further comprises:

(i) establishing a plurality of filters in accordance with a pre-determined tint percentage for the available colorants which in combination are representative of the at least one unavailable colorant, wherein each of the plurality of filters is a one dimensional stochastic filter; and applying the plurality of filters to the color separation in the first plurality of halftone color separations corresponding to the at least one unavailable colorant; and combining the set of halftone color separations representative of the at least one unavailable colorant with the color separations in the first plurality of halftone color separations corresponding to the available colorants to produce the second plurality of halftone color separations.

4. A method for converting a first plurality of halftone color separations into a second plurality of halftone color separations, the first plurality of halftone color separations representing an image, the second plurality of halftone color separations corresponding to available colorants on a target output device, the method comprising the steps of:

determining which of the first plurality of halftone color separations correspond to the available colorants on the target output device;

determining which of the first plurality of halftone color separations correspond to colorants that are unavailable on the target output device to identify at least one unavailable colorant;

converting the at least one halftone color separation in the first plurality of halftone color separations corresponding to the at least one unavailable colorant into a set of color separations representative thereof, the set of color separations corresponding in colorant to the available colorants, wherein the step of converting further comprises:

(i) establishing a plurality of filters in accordance with a pre-determined tint percentage for the available colorants which in combination are representative of the at least one unavailable colorant, wherein each of the plurality of filters is a two dimensional stochastic filter; and applying the plurality of filters to the color separation in the first plurality of halftone color separations corresponding to the at least one unavailable colorant; and combining the set of halftone color separations representative of the at least one unavailable colorant with the color separations in the first plurality of halftone color separations corresponding to the available colorants to produce the second plurality of halftone color separations.

* * * * *

UNITED STATES PATENT AND TRADEMARK OFFICE
CERTIFICATE OF CORRECTION

PATENT NO. : 6,801,336 B1
DATED : October 5, 2004
INVENTOR(S) : R. Cook et al.

It is certified that error appears in the above-identified patent and that said Letters Patent is hereby corrected as shown below:

Title page,
Item [56], References Cited, FOREIGN PATENT DOCUMENTS,
"JP 0820187 A2" should read -- EP 0820187 A2 --; insert the following in appropriate order -- EP 0770228 B1 11/1998 --

Column 9,
Line 2, "unavailable colorant:" should read -- unavailable colorant; --
Line 8, "colorants: and" should read -- colorants; and --

Signed and Sealed this

Fourth Day of January, 2005

JON W. DUDAS
*Director of the United States Patent and Trademark Office*